United States Patent
Edwards et al.

(10) Patent No.: US 10,197,666 B2
(45) Date of Patent: Feb. 5, 2019

(54) ANOMALOUS PROPAGATION DETECTION (71) Applicant: BAE SYSTEMS plc, London (GB)

(72) Inventors: Philip Trevelyan Edwards, Isle of Wight (GB); John Alexander Parle, Isle of Wight (GB); Marcus Edward Clark, Isle of Wight (GB)

(73) Assignee: BAE SYSTEMS plc, London (GB)

( * ) Notice: Subject to any disclaimer, the term of this patent is extended or adjusted under 35 U.S.C. 154(b) by 291 days.

(21) Appl. No.: 15/021,589

(22) PCT Filed: Sep. 9, 2014

(86) PCT No.: PCT/GB2014/052720
§ 371 (c)(1),
(2) Date: Mar. 11, 2016

(87) PCT Pub. No.: WO2015/036741
PCT Pub. Date: Mar. 19, 2015

(65) Prior Publication Data
US 2016/0223648 A1 Aug. 4, 2016

(30) Foreign Application Priority Data

Sep. 13, 2013 (EP) .................................... 13275212
Sep. 13, 2013 (GB) .................................... 1316288.8

(51) Int. Cl.
G01S 7/292 (2006.01)
G01S 7/41 (2006.01)

(52) U.S. Cl.
CPC ............ *G01S 7/2921* (2013.01); *G01S 7/414* (2013.01)

(58) Field of Classification Search
CPC ..... G01S 7/2921; G01S 7/414; G01S 13/5246
See application file for complete search history.

(56) References Cited

U.S. PATENT DOCUMENTS 3,875,569 A * 4/1975 Hill ........................ G01S 7/2921
342/379
4,064,511 A * 12/1977 Manfanovsky ....... G01S 7/2921
342/102

(Continued)

FOREIGN PATENT DOCUMENTS

EP 1635190 A1 3/2006
GB 811470 4/1959

(Continued)

OTHER PUBLICATIONS

International Preliminary Report on Patentability received for Patent Application No. PCT/GB2014/052720 dated Mar. 24, 2016. 8 pages.

(Continued)

*Primary Examiner* — Bernarr E Gregory
(74) *Attorney, Agent, or Firm* — Finch & Maloney PLLC (57) ABSTRACT

Disclosed is a method of detecting an anomalous propagation condition in a Radar system, comprising the steps of: subtracting returns received in a first receive period from returns received in a succeeding second receive period, and repeating this step for a plurality of receive periods; and if the step of subtracting gives a result in excess of a predetermined threshold in one of the plurality of receive periods, then registering this as a possible anomalous propagation condition.

14 Claims, 4 Drawing Sheets

100 Antenna
110 Receiver
120 Anomalous Propagation Detector
130 Transmitter
140 Transmit Controller

(56) References Cited

U.S. PATENT DOCUMENTS

| | | | | |
|---|---|---|---|---|
| 4,095,222 A | * | 6/1978 | Mooney, Jr. | G01S 13/5246 |
| 4,104,631 A | * | 8/1978 | Weigle et al. | G01S 13/5246 |
| 4,633,254 A | * | 12/1986 | Giaccari | G01S 13/5246 |
| 4,973,968 A | | 11/1990 | Hurd | |
| 7,675,458 B2 | * | 3/2010 | Hubbard | G01S 13/5246 342/159 |
| 7,973,698 B1 | | 7/2011 | Woodell et al. | |
| 8,125,374 B2 | * | 2/2012 | Edwards | G01S 13/5246 342/159 |
| 2009/0096662 A1 | * | 4/2009 | Wang | G01S 13/5246 342/93 |

FOREIGN PATENT DOCUMENTS

| | | |
|---|---|---|
| GB | 2335103 A | 9/1999 |
| JP | S5455198 A | 5/1979 |
| WO | 2015036741 A1 | 3/2015 |

OTHER PUBLICATIONS

International Search Report and Written Opinion received for Patent Application No. PCT/GB2014/052720 dated Nov. 19, 2014. 9 pages.

GB Intellectual Property Office Search Report under Section 17(5) received for GB Patent Application No. 1316288.8 dated Jan. 30, 2014. 4 pages.

Extended European Search Report received for EP Patent Application No. 13275212.2 dated Feb. 6, 2014. 7 pages.

French, Andrew, "Target recognition techniques for multifunction phased array radar," A thesis submitted for the degree of Doctor of Philosophy of the University College London, Jan. 1, 2010. Retrieved from the Internet at: http://discovery.ucl.ac.uk/19675/1/19675.pdf [retreived on Jan. 20, 2014]. 316 pages.

\* cited by examiner

100 Antenna
110 Receiver
120 Anomalous Propagation Detector
130 Transmitter
140 Transmit Controller

ANOMALOUS PROPAGATION DETECTION

FIELD

The present invention relates to the field of radars. Specifically, the present invention relates to the detection and mitigation of anomalous propagation effects in radars.

BACKGROUND TO THE PRESENT INVENTION

Anomalous propagation effects can cause a large number of unwanted returns in radar systems subject to certain environmental conditions.

For the purposes of this application, the term anomalous propagation covers the different electromagnetic wave propagations not encountered in a standard atmosphere that refer to cases when a signal propagates below the normal radio horizon.

Figure 1:
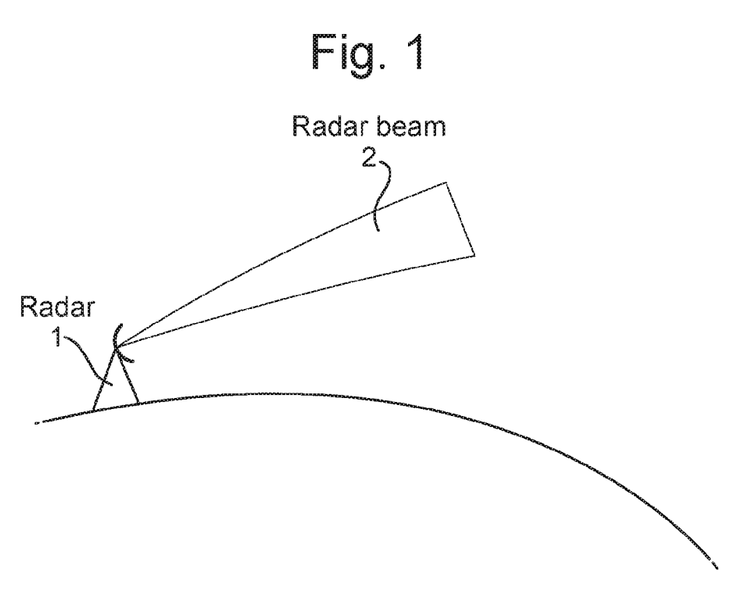
FIG. 1 shows a representation of normal propagation conditions.

For example, as shown in FIG. 1, when a radar system 1 is located in a hot and humid environment, this environmental condition causes radar pulses to be transmitted over very long distances and below the horizon. These pulses then reflect from objects located far from the radar system, over the horizon, such as oil rigs or mountain ranges which were never anticipated to be part of the radar return.

In typical atmospheric conditions, one can normally assume that an electromagnetic wave 2 moves through the troposphere in air that decreases in temperature in a predictable way as height increases as illustrated in FIG. 1. If this is not the case, then the electromagnetic wave will follow a different path, which can lead to super-refraction or sub-refraction.

In certain situations, it can be the case that a layer of air can be cooler than the air above it, breaking the above assumptions for typical atmospheric condition. This situation is sometimes termed a "temperature inversion", and an example of this situation is where a first layer of air near the ground starts cooling at night while another layer of air remains warm away from the ground and above the first layer.

Figure 2:
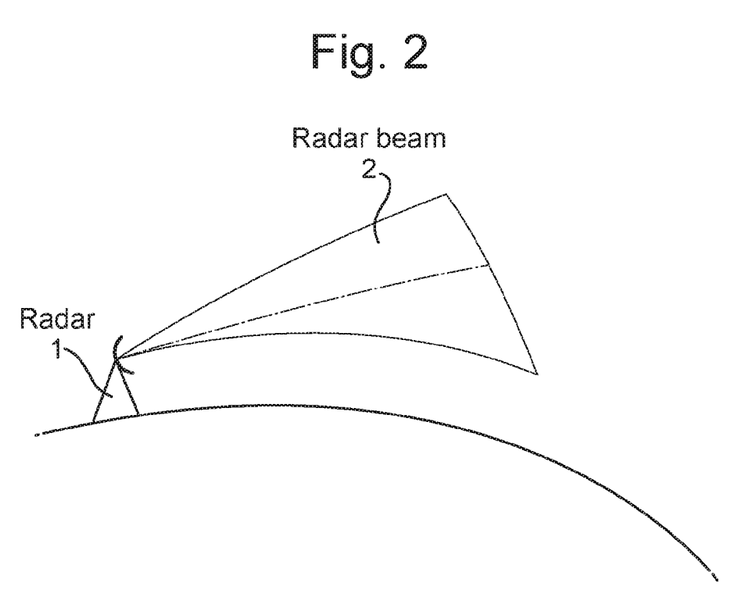
FIG. 2 shows a representation of anomalous propagation conditions, caused by a temperature inversion.

When such a "temperature inversion" occurs, the refractive index of the air increases and an electromagnetic wave passing through the affected area is subject to anomalous propagation where the wave path bends towards the Earth's surface rather than continuing up into the troposphere as illustrated in FIG. 2.

Where the "temperature inversion" is located at the surface of the Earth, the electromagnetic beam will eventually hit the surface and a portion will reflect and be received by the radar system and the remainder will continue in the forward direction, be refracted downwards again, and hit the earth's surface again at a longer range. This may continue many times. Alternatively, where the "temperature inversion" is away from the Earth's surface, for instance in a zone where a cooler and a warmer mass of air collide, the electromagnetic beam can have its path bent within the layer of air such that it extends the distance the beam travels, possibly beyond the expected transmission distance.

Figure 3:
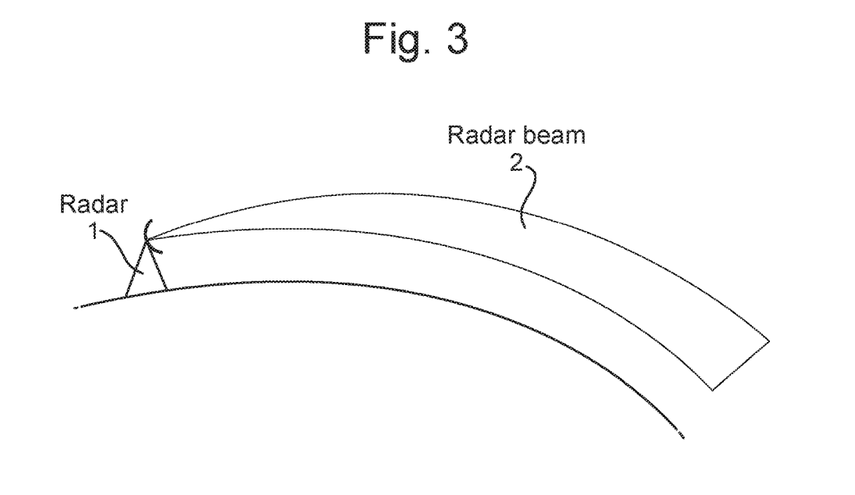
FIG. 3 shows a representation of "ducting"

The extreme of this situation is when the "temperature inversion" is very strong and shallow, such that the electromagnetic beam is trapped within the "temperature inversion" layer and the beam stays within the layer as it would behave in a waveguide. This is usually termed "ducting". This is illustrated in FIG. 3.

In surface-based "ducting", that is to say where an electromagnetic beam is trapped in a "temperature inversion" layer near the surface of the Earth, the beam will repeatedly reflect from the ground and then from the "temperature inversion" layer. This will cause return echoes every time the beam reflects from the ground.

The net effect of any of these anomalous propagation conditions on the performance of the Radar is that signals received at the antenna, which could normally be assumed to be returns or reflections from an object at a certain range, could actually be reflections from an object positioned significantly further away and possibly even below the usual Radar horizon. Such returns are termed anomalous targets or clutter, are range ambiguous, and can interfere with the normal processing of received signal, meaning that potential targets of interest can be lost amongst the anomalous signals. This can have an adverse effect on the performance of the Radar system and can potentially place it in danger in the event that one of the missed targets is actually a threat.

In a marine setting, where the Radar is installed on a ship, examples of the kind of objects which could cause such returns include land masses or shorelines, oil rigs, aircraft or large slow-moving vessels, such as tankers.

It is known to use so-called guard pulses, which are transmitted from the Radar ahead of the normal pulses which are to be processed by the Radar. Guard pulses are additional pulses inserted at the start of a burst, and are intended to illuminate clutter that is beyond the Radar's non-ambiguous maximum range, so that it can be cancelled by Moving Target Detection (MTD) processing in the later PRIs of the burst. Any returns received in the PRIs immediately following their transmission are not processed, but discarded.

As an example, if anomalous clutter is present in the fifth and subsequent receive periods of a burst, then 4 guard pulses can be transmitted ahead of the normal pulses. Any signals received in the first 4 receive periods, corresponding to the guard pulses are effectively ignored and only the subsequent pulses are processed and treated as valid signals. The returns from the anomalous clutter are processed by the receiver using coherent filter processing, which is able to ensure that such returns are effectively discounted.

Even though the use of guard pulses is effective in dealing with anomalous clutter, the transmission of extra guard pulses wastes valuable Radar time which, in the case of a Multi-function Radar (MFR), could be better used performing other tasks. In this way, the overall performance of the radar system can be adversely affected by transmitting guard pulses unless deemed absolutely necessary.

It is an aim of embodiments of the present invention to provide a means for identifying anomalous propagation conditions in a Radar system.

According to a first aspect of the present invention, there is provided a method of detecting an anomalous propagation condition in a Radar system, comprising the steps of: subtracting returns received in a first receive period from returns received in a succeeding second receive period, and repeating this step for a plurality of receive periods; and if the step of subtracting gives a result in excess of a predetermined threshold in one of the plurality of receive periods, then registering this as a possible anomalous propagation condition.

Preferably, an azimuthal scan is divided into a plurality of sectors, and in order to confirm an anomalous propagation condition, a possible anomalous propagation condition must be registered in at least a predetermined number of the plurality of sectors.

Preferably, the predetermined number of sectors is one.

Preferably, an operator is alerted to an anomalous propagation condition and is then able to manually alter the operation of the Radar accordingly.

Preferably, detection of an anomalous propagation condition automatically triggers the insertion of one or more additional guard pulses.

Preferably, if an anomalous propagation condition is no longer detected, the Radar automatically reverts to its previous mode of operation and any additional guard pulses are removed.

According to a second aspect of the present invention, there is provided a Radar system arranged to detect the presence of anomalous propagation conditions, comprising: a transmitter; a transmit controller, operable to supply the transmitter with a waveform for transmission; a receiver, operable to receive signals returned in response to the transmission of a waveform; and an anomalous propagation detector, operable to detect the presence of anomalous propagation conditions by subtracting returns received in a first receive period from returns received in a succeeding second receive period, and repeating this step for a plurality of receive periods; and if the step of subtracting gives a result in excess of a predetermined threshold in one of the plurality of receive periods, then registering this as a possible anomalous propagation condition and, instructing the transmit controller to insert one or more additional guard pulses into the transmit waveform.

BRIEF DESCRIPTION OF THE FIGURES

For a better understanding of the invention, and to show how embodiments of the same may be carried into effect, reference will now be made, by way of example, to the accompanying diagrammatic drawings in which.

DETAILED DESCRIPTION OF PREFERRED EMBODIMENT

Embodiments of the present invention provide an improved means of detecting anomalous propagation (also known as ANAPROP or ANOPROP) conditions in a Radar system. As mentioned previously, this condition is generally dealt with by modifying the Radar's transmit pulses by inserting guard pulses of a certain number to relate to the distance which it is required to guard against. Specifically, if P pulses are transmitted, and the first Q pulses are guard pulses, then the first of the NON-guard pulses will arrive in parallel with folded clutter from at least Q range ambiguities, or equivalently from Q+1 times the unambiguous range due to the PRF However, use of guard pulses degrades the Radar performance in other ways, such as velocity discrimination, and so it is generally preferred not to insert guard pulses unless absolutely necessary.

As such, accurately determining that anomalous propagation conditions are present is important.

Figure 4:
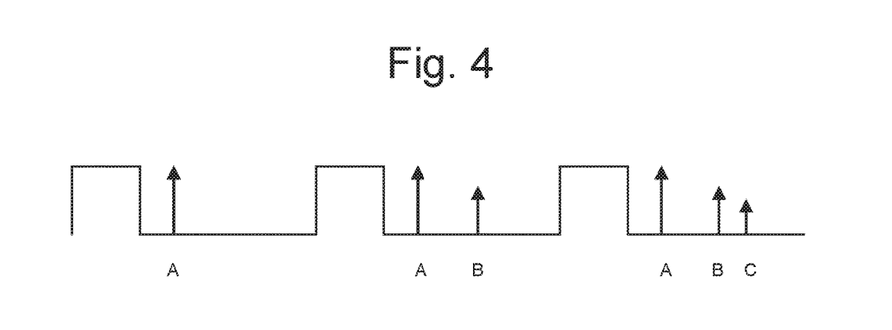
FIG. 4 illustrates the effect of receiving return signals in subsequent receive periods.

FIG. 4 illustrates the fundamental concept underlying embodiments of the present invention. FIG. 4 shows three successive transmit pulses. The first pulse is the first to be transmitted in a given burst. The second and third pulses follow it immediately.

In the receive period immediately following the first pulse, there is a signal A received. This is received in the receive period following the first pulse and in response to the first pulse. This is therefore in the so-called unambiguous period.

After the first pulse, a second pulse is transmitted. In the receive period following the second pulse, a signal A is received, and so is a signal B, slightly after A. B is received in relation to a target in the ambiguous range, in response to the first pulse but received after the second pulse has been transmitted.

After the second pulse, a third pulse is transmitted. In the receive period following the third pulse, a signal A is received unambiguously. A signal B is received in the ambiguous range—in this case in response to the second pulse but after the third pulse has been transmitted. Finally, a signal C is received, also in the ambiguous range. Signal C is received in response to the first pulse, but is not received until after the third pulse has been transmitted.

As can be seen in the absence of any other information, it is not possible to determine the range associated with the received signals, and objects located at great distances can appear to be much closer. The example shown in FIG. 4 is simplistic in that it only shows the situation when three pulses are transmitted. A typical burst can include 10 to 20 such pulses or more and this can have the effect of objects from a great distance away mistakenly being considered as nearby targets or potential targets.

In order to protect against anomalous propagation conditions, a determination is made of the number of guard pulses which are required. When the Radar system is being designed, the transmit waveform is configured to deal with a range of different environments. Part of this design process takes into account anomalous propagation conditions and the system specification will usually detail expected performance levels for different situations, including where anomalous propagation conditions exist.

In situations where anomalous propagation conditions exist, then it is necessary to provide additional guard pulses to provide protection against returns which are received from farther out in range than would be experienced in the absence of such propagation conditions. Embodiments of the present invention act to detect the presence of anomalous propagation conditions, and then allow the Radar to operate in a mode whereby additional guard pulses are inserted to ameliorate the problems associated with anomalous propagation.

The detections in any one receive period are subtracted from the succeeding receive period, which will leave only detections received from previous transmitted pulses. In the example of FIG. 4, the detections received in the first period are subtracted from those received in the second period, and that leaves B, since the two detections A are subtracted to leave zero. Similarly, the detections in the second receive period are subtracted from the detections in the third receive period, which leaves only detection C in that case.

Of course, the exact values of e.g. detection A in successive receive periods may differ and so the use of a threshold may be desirable. For instance if A and A' are returns due to the same target but the absolute value in one receive period is slightly larger than the succeeding one, then the subtraction process will not yield a value of zero. Instead, a value can be defined such that if |A−A'| is less that the defined value, it is assumed that the returns are effectively identical and give a value of zero when subtracted.

As can be seen by tracking the subtractions, it is possible to determine the distance or range of the ambiguous clutter. In the example above, the detection B can be determined to be from a range equivalent to two pulses and the detection C can be determined to be from a range equivalent to three pulses. This approach is adopted for all detections received for all pulses within a burst. Therefore, once the desired range is decided, any detections from outside that range can be regarded as being detected due to anomalous propagation conditions.

Figure 5:
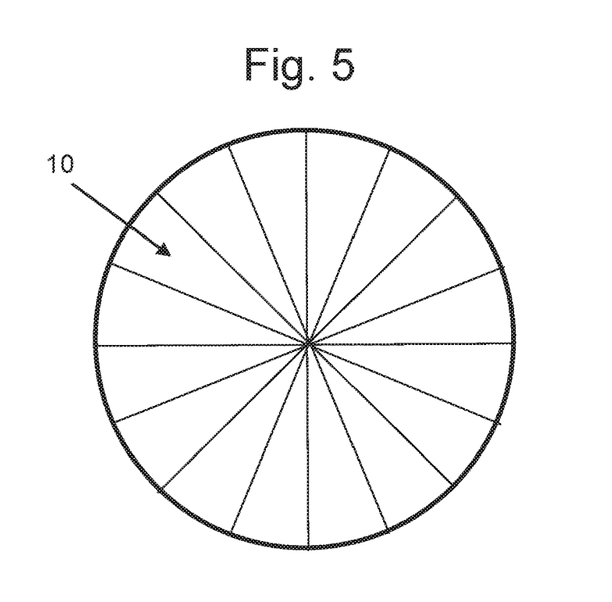
FIG. 5 shows how a scan is divided into a plurality of azimuth sectors.

In an embodiment of the present invention, the full azimuthal scan of the Radar is divided into a plurality of sectors 10, each corresponding to several bursts, as shown in FIG. 5. If anomalous propagation conditions are detected within one sector, a counter is incremented by one. A decision is then made as to whether to alert an operator to anomalous propagation conditions. A threshold may be applied such that more than a predetermined number of sectors are required to show anomalous propagation conditions before an alert is created. This can be determined by comparing the value of the counter with the predetermined number. The counter is reset each scan.

Alternatively, it may be sufficient for a single sector to show such conditions for the alert to be created. The approach adopted can be varied depending on the operational requirements of the Radar.

The alert takes the form of an audible or visual warning to an operator of the Radar system. Once the operator knows that anomalous propagation conditions are present, he can make a decision to activate a mode whereby guard pulses are added to the transmit waveforms, to effectively counteract said conditions. In fact, no additional pulses are added to the transmit waveform; rather, one or more of the pulses already transmitted are re-designated as guard pulses. So, if P pulses are transmitted, Q of which are guard pulses, and the anomalous propagation mode is selected which requires the addition of, for example, 2 further guard pulses, that leaves a total of P−(Q+2) pulses available for processing. Alternatively, if anomalous propagation is detected, then guard pulses may be added to the transmit waveform automatically, without operator intervention.

Figure 7A:
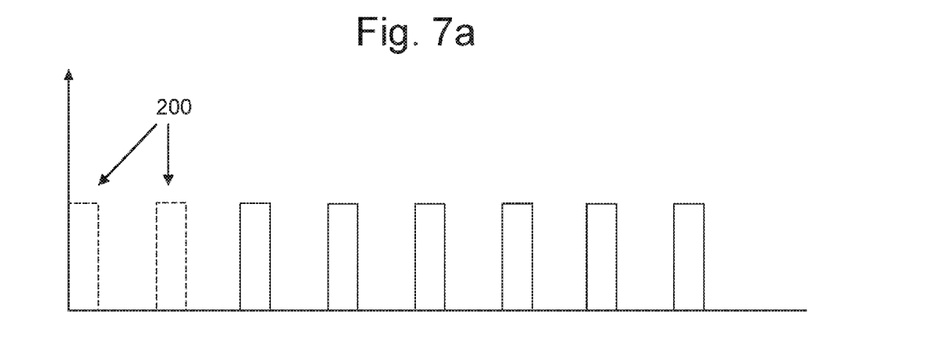
FIGS. 7a and 7b show the effect of inserting guard pulses into a burst for transmission.

FIGS. 7a and 7b illustrate this scenario. In FIG. 7a, which is a normal mode of operation (i.e. no anomalous propagation), two guard pulses 200 (shown as dashed lines) are provided in a given burst of 8 pulses. This leaves 6 pulses available for processing.

Figure 7B:
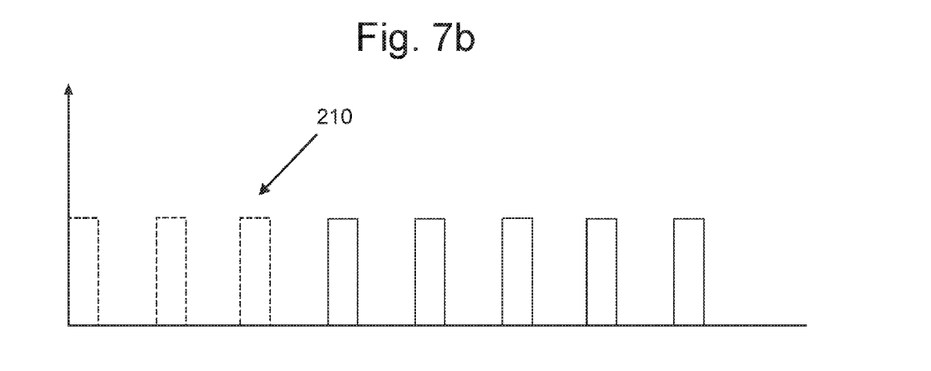

FIG. 7b, shows a similar burst in anomalous propagation mode. In addition to the previous 2 guard pulses 200, a further guard pulse 210 is added, but the total number of pulses in the burst remains unchanged. This now leaves only 5 pulses available for processing. This illustrates one of the reasons why it is generally undesirable to operate in anomalous propagation mode for extended periods, since the overall performance of the Radar can be degraded.

Since, as stated previously, the use of guard pulses is generally undesirable due to the adverse effect they have on other operations of the Radar system, embodiments of the present invention continue checking for anomalous propagation conditions even when guard pulses are inserted, since it is desirable to revert to a mode without the additional guard pulses (inserted as a result of engaging the anomalous propagation mode) as soon as possible, once the conditions are no longer present, noting that there may still be guard pulses present in any event. As such, a check is made for anomalous propagation condition as described previously and if a scan is completed without the counter being incremented, this indicates that the conditions are no longer present and the Radar is automatically placed into a mode without additional guard pulses (inserted as a result of engaging the anomalous propagation mode). Alternatively, a certain number of successive scans may need to be completed, each of which fails to show anomalous propagation conditions before normal operation is resumed. This configuration is generally preferred, since it prevents the anomalous propagation mode being enabled and disabled too frequently.

Figure 6:
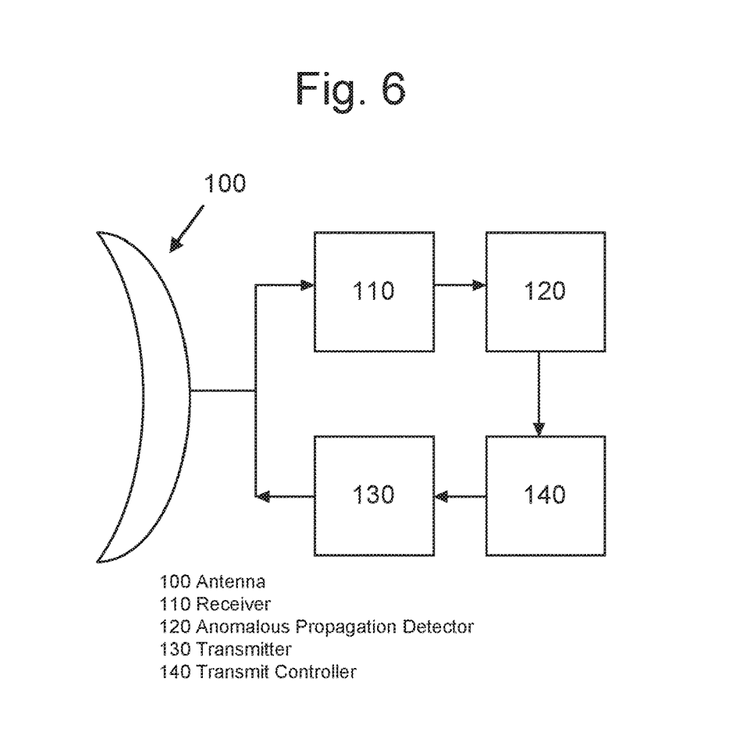
FIG. 6 shows a hardware implementation of an embodiment of the present invention.

FIG. 6 shows a hardware implementation of an embodiment of the present invention. The Antenna 100 is connected to a receive chain and a transmit chain. The antenna 100 comprises additional RF circuitry, such as a duplexer, to allow it to function in both transmit and receive modes.

The transmitter 130 is controlled by transmit controller 140, and converts digital signals into analogue RF signals for transmission by the antenna 100. The transmit controller 140 is operable to supply the transmitter with certain forms of waveform, and is responsible for the insertion of guard pulses, as required to combat anomalous propagation.

The receiver 110, receives signals from the antenna, in response to pulses sent from the transmitter. The receiver passes the received signals to the anomalous propagation detector 120 which operates as set out previously to determine if anomalous propagation conditions are present. If such conditions are present, then a signal is sent from the anomalous propagation detector to the transmit controller 140 to insert guard pulses as required to combat the anomalous propagation conditions. This step may be automated or may require operator input.

By use of embodiments of the present invention, it is possible to better determine the presence of anomalous propagation and so ensure that the insertion of guard pulses to combat it is only performed once the presence of the condition is confirmed.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of detecting an anomalous propagation condition in a Radar system, the method comprising:
   executing, via the Radar system, a plurality of azimuthal scans over a plurality of receive periods comprising a first receive period and a succeeding second receive period, each azimuthal scan of the plurality of azimuthal scans being divided into a plurality of sectors;
   for each sector of the plurality of sectors, subtracting returns received in the first receive period from returns received in the succeeding second receive period to calculate a result;
   repeating the subtracting for the plurality of receive periods, thereby calculating a plurality of results;
   if the subtracting gives a result of the plurality of results that is in excess of a predetermined threshold, registering a possible anomalous propagation condition; and
   confirming the anomalous propagation condition where at least one possible anomalous propagation condition is registered in each of a predetermined plurality of the plurality of sectors.

2. The method of claim 1, further comprising issuing an alert and allowing operation of the Radar system to be manually altered in response to confirming the anomalous propagation condition.

3. The method of claim 1, wherein confirming the anomalous propagation condition automatically triggers the insertion of one or more additional guard pulses.

4. The method of claim 3, wherein if an anomalous propagation condition is no longer confirmed after insertion of the one or more additional guard pulses, reverting the Radar system to a previous mode of operation and removing any additional guard pulses.

5. A Radar system arranged to detect anomalous propagation conditions, the Radar system comprising:
   a transmitter;
   a transmit controller, operable to supply the transmitter with a waveform for transmission;
   a receiver, operable to receive signals returned in response to the transmission of a waveform; and
   an anomalous propagation detector, operable to detect anomalous propagation conditions by:
      executing a plurality of azimuthal scans over a plurality of receive periods comprising a first receive period and a succeeding second receive period, each azimuthal scan of the plurality of azimuthal scans being divided into a plurality of sectors;
      for each sector of the plurality of sectors, subtracting returns received in the first receive period from returns received in the succeeding second receive period to calculate a result;
      repeating the subtracting for the plurality of receive periods, thereby calculating a plurality of results;
      if the step of subtracting gives a result of the plurality of results that is in excess of a predetermined threshold, registering a possible anomalous propagation condition; and
      confirming an anomalous propagation condition where at least one possible anomalous propagation condition is registered in each of a predetermined plurality of the plurality of sectors.

6. The Radar system of claim 5, wherein in response to an anomalous propagation condition being confirmed, the anomalous propagation detector is further configured to allow issuing of an alert and operation of the Radar system to be manually altered.

7. The Radar system of claim 5, wherein confirmation of an anomalous propagation condition by the anomalous propagation detector automatically triggers insertion of one or more additional guard pulses, and if an anomalous propagation condition is no longer confirmed after insertion of the one or more additional guard pulses, any additional guard pulses are removed.

8. A non-transitory computer readable medium encoding instructions that when executed by one or more processors carry out a process for detecting an anomalous propagation condition in a Radar system, the process comprising:
   executing, via the Radar system, a plurality of azimuthal scans over a plurality of receive periods comprising a first receive period and a succeeding second receive period, each azimuthal scan of the plurality of azimuthal scans being divided into a plurality of sectors;
   for each sector of the plurality of sectors, subtracting returns received in the first receive period from returns received in the succeeding second receive period to calculate a result;
   repeating the subtracting for the plurality of receive periods, thereby calculating a plurality of results;
   if the subtracting gives a result of the plurality of results that is in excess of a predetermined threshold, registering a possible anomalous propagation condition; and
   confirming the anomalous propagation condition where at least one possible anomalous propagation condition is registered in each of a predetermined plurality of the plurality of sectors.

9. The non-transitory computer readable medium of claim 8, wherein the instructions, when executed by the one or more processors, carry out a process further comprising causing issuance of an alert in response to confirmation of the anomalous propagation condition and allowing operation of the Radar system to be manually altered.

10. The non-transitory computer readable medium of claim 8, wherein the instructions, when executed by the one or more processors, carry out a process further comprising, in response to confirmation of the anomalous propagation condition, automatically triggering the insertion of one or more additional guard pulses.

11. The non-transitory computer readable medium of claim 10, wherein the instructions, when executed by the one or more processors, carry out a process further comprising, in response to an anomalous propagation condition no longer being detected, automatically removing any additional guard pulses.

12. The non-transitory computer readable medium of claim 11, wherein the instructions, when executed by the one or more processors, carry out a process further comprising, in response to an anomalous propagation condition no longer being detected, automatically reverting the Radar system to a previous mode of operation prior to confirmation of the anomalous propagation condition.

13. The non-transitory computer readable medium of claim 8, wherein the non-transitory computer readable medium is disposed and operable within a computer system.

14. The non-transitory computer readable medium of claim 8, wherein the non-transitory computer readable medium is disposed and operable within the Radar system.

\* \* \* \* \*